(12) United States Patent
Beaurepaire et al.

(10) Patent No.: US 11,460,315 B2
(45) Date of Patent: Oct. 4, 2022

(54) METHOD AND APPARATUS FOR COMPUTING SHARED VEHICLE PARKING SEARCH ROUTES

(71) Applicant: HERE GLOBAL B.V., Eindhoven (NL)

(72) Inventors: Jerome Beaurepaire, Berlin (DE); David Falla-Cepeda, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 390 days.

(21) Appl. No.: 16/373,294

(22) Filed: Apr. 2, 2019

(65) Prior Publication Data
US 2020/0318991 A1 Oct. 8, 2020

(51) Int. Cl.
*G01C 21/36* (2006.01)
*G01C 21/34* (2006.01)

(52) U.S. Cl.
CPC ..... *G01C 21/3685* (2013.01); *G01C 21/3461* (2013.01)

(58) Field of Classification Search
CPC ................ G01C 21/34; G01C 21/3407; G01C 21/3461; G01C 21/36; G01C 21/3685; G08G 1/14
See application file for complete search history.

(56) References Cited

U.S. PATENT DOCUMENTS

| | | |
|---|---|---|
| 9,671,237 B1 | 6/2017 | Eliassi et al. |
| 2012/0098677 A1* | 4/2012 | Geelen ............... G01C 21/3685 340/932.2 |
| 2014/0214319 A1 | 7/2014 | Vucetic et al. |
| 2015/0310744 A1 | 10/2015 | Farrelly et al. |
| 2016/0061618 A1 | 3/2016 | Benenson et al. |
| 2018/0274930 A1* | 9/2018 | Wisbrun ............ G01C 21/3407 |
| 2018/0286237 A1* | 10/2018 | Hu .......................... H04W 4/02 |

OTHER PUBLICATIONS

Gao et al., abstract of "Collaborative Route Plan for Parking Sites Selection in Bike-Sharing Systems", Conference Paper, May 2018, Published in 2018 IEEE 22nd International Conference on Computer Supported Cooperative Work in Design ((CSCWD)), 1 page.

* cited by examiner

*Primary Examiner* — Jess Whittington
*Assistant Examiner* — Terry C Buse
(74) *Attorney, Agent, or Firm* — Ditthavong, Steiner & Mlotkowski

(57) ABSTRACT

An approach is provided for providing a shared vehicle parking search route. The approach involves determining that a vehicle is nearing a destination. The approach also involves determining a boundary of a service area in which the vehicle is to remain. The approach further involves generating a parking search route for the vehicle to locate a parking space in proximity to the destination based, at least in part, on the boundary.

20 Claims, 16 Drawing Sheets

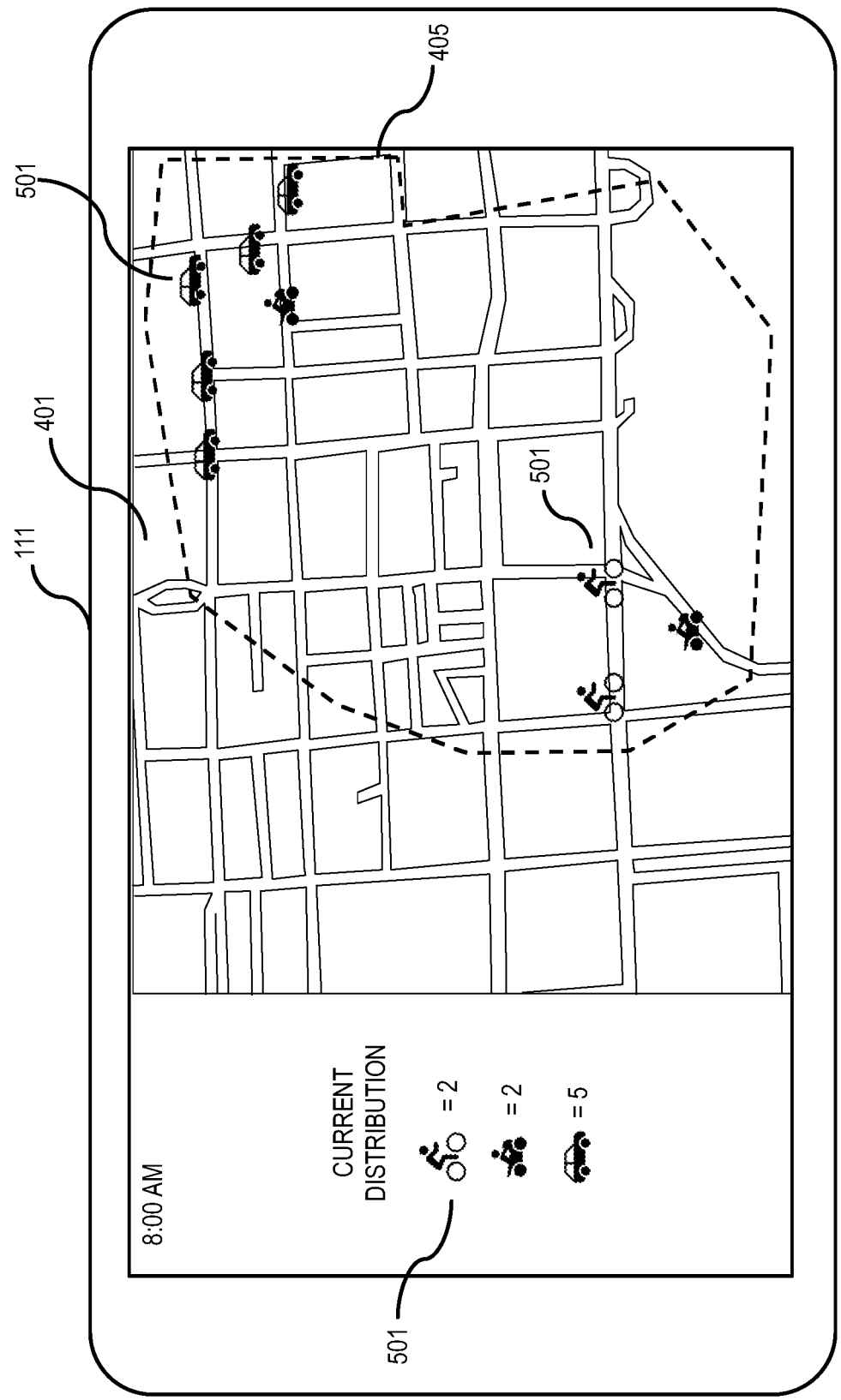

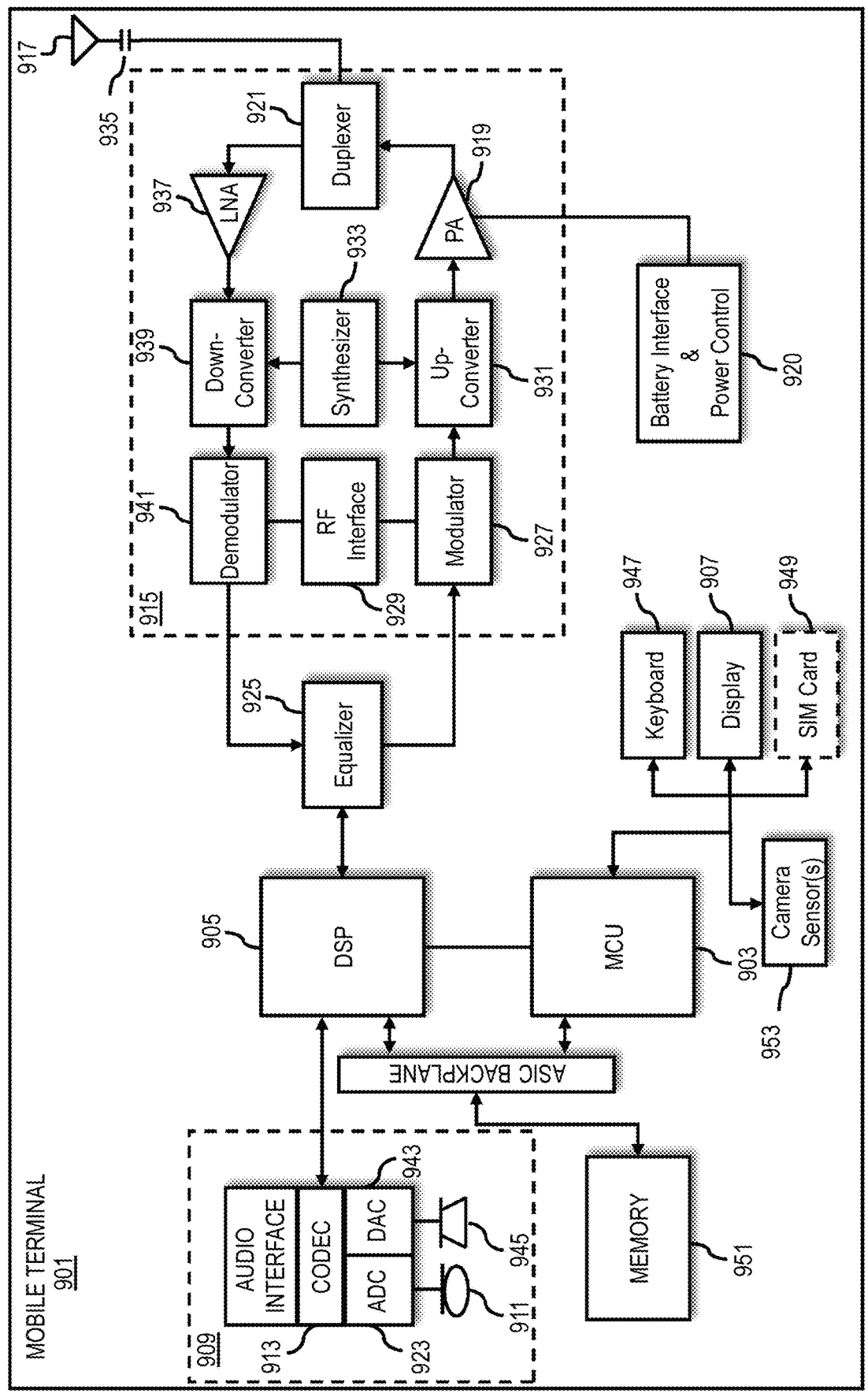

METHOD AND APPARATUS FOR COMPUTING SHARED VEHICLE PARKING SEARCH ROUTES

BACKGROUND

Providing navigation support to users is an important function for map service providers. Modern devices such as sophisticated navigation and communication systems can enable users or drivers of vehicles to have a better understanding of what is ahead or approaching on a road or route. In addition, providing parking support information (e.g., parking locations and/or parking availability) is another important function for map service providers. Further, vehicle sharing services can provide users convenience and flexibility in terms of where they can pick up and drop off shared vehicles (e.g., cars, bicycles, scooters, etc.) without the burden of vehicle ownership. However, generating parking search routes for such vehicles can be challenging because shared vehicle service providers often limit use of their shared vehicles to one or more designated service areas for logistic, capacity, and/or planning reasons.

Some Example Embodiments

Therefore, there is a need for providing a shared vehicle parking search route that accounts for the operating area constraints and dynamic distributions of such vehicles.

According to one embodiment, a computer-implemented method for generating a parking search route comprises determining that a vehicle is nearing a destination. The method also comprises determining a boundary of a service area in which the vehicle is to remain. The method further comprises generating a parking search route for the vehicle to locate a parking space in proximity to the destination based, at least in part, on the boundary.

According to another embodiment, an apparatus for generating a parking search route comprises at least one processor, and at least one memory including computer program code for one or more computer programs, the at least one memory and the computer program code configured to, with the at least one processor, cause, at least in part, the apparatus to determine that a shared vehicle is nearing a destination. The apparatus is also caused to determine a service constraint for the shared vehicle from a shared vehicle service operator. The apparatus is further caused to generate a parking search route for the shared vehicle to locate a parking space in proximity to the destination based, at least in part, on the service constraint.

According to another embodiment, a non-transitory computer-readable storage medium for generating a parking search route carries one or more sequences of one or more instructions which, when executed by one or more processors, cause, at least in part, an apparatus to perform determining that a vehicle is nearing a destination. The apparatus is also caused to perform determining a target distribution for the vehicle. The apparatus is further caused to perform generating a parking search route for the vehicle to locate a parking space in proximity to the destination based, at least in part, on the target distribution.

According to another embodiment, an apparatus for generating a parking search route comprises means for determining that a vehicle is nearing a destination. The apparatus also comprises means for determining a boundary of a service area in which the vehicle is to remain. The apparatus further comprises means for generating a parking search route for the vehicle to locate a parking space in proximity to the destination based, at least in part, on the boundary.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A through 5C are diagrams of example user interfaces for inputting one or more shared vehicle parking search route parameters, according to one embodiment;

FIG. 9 is a diagram of a mobile terminal (e.g., handset or vehicle or part thereof) that can be used to implement an embodiment.

DESCRIPTION OF SOME EMBODIMENTS

Examples of a method, apparatus, and computer program for providing a shared vehicle parking search route are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
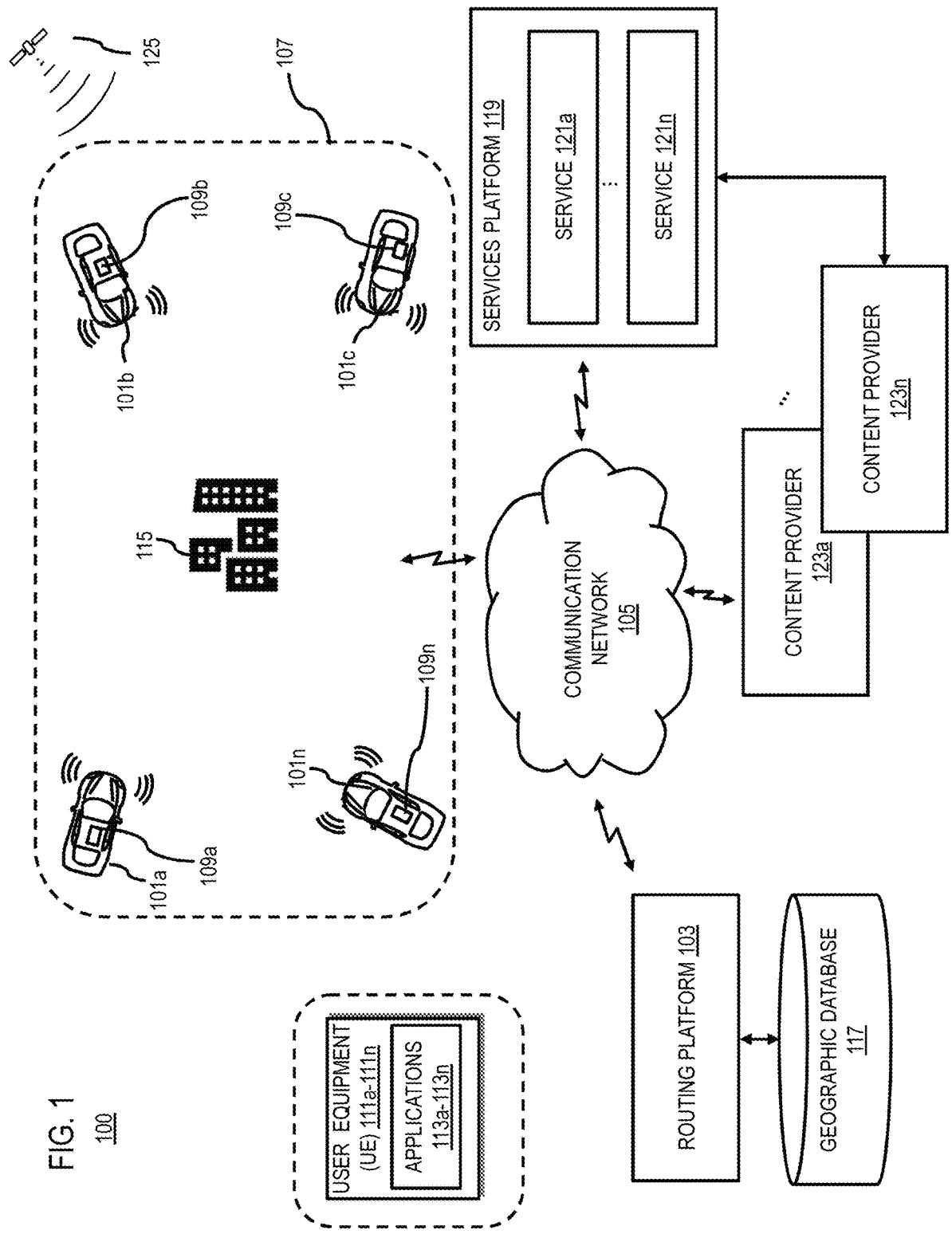
FIG. 1 is a diagram of a system capable of providing a shared vehicle parking search route, according to one embodiment.

FIG. 1 is a diagram of a system capable of providing a shared vehicle parking search route, according to one embodiment. As described above, providing navigation support to users is an important function for map service providers. By way of example, a user may be a driver of a standard vehicle (e.g., a car, a truck, a motorcycle, etc.), a shared vehicle (e.g., a shared car, a shared scooter, a shared bicycle, a shared roller, etc.), a passenger of an autonomous or highly-automated vehicles (HAD) vehicle, a cyclist, a pedestrian, or a combination thereof. Navigation systems (e.g., an embedded car navigation system, a mobile device, etc.) can enable users to have a better understanding of what is coming ahead or approaching on a road or route on which they are traveling.

As mentioned above, parking guidance and/or parking related information is also an integral function for map service providers. For example, a user may want to know where she or he can find parking (e.g., on-street parking, car parks, parking garages, etc.) at or near a given destination (e.g., within walking distance of the destination) and she or he may also want to know whether parking is or will be available at such locations and times. In many instances, a user may want to know this information in real time or substantially real time. Parking guidance and/or parking search routes may be particularly useful to users in areas where finding a parking space is often time consuming and/or frustrating (e.g., in a city center) due to a limited number of free spaces and/or many users simultaneously looking for parking.

Providing parking guidance and/or parking related information in connection with shared vehicles presents a unique set of challenges (e.g., when compared to standard vehicles, autonomous vehicles, or HAD vehicles). Shared vehicle service providers enable users to access vehicles upon request from a pool of shared vehicles. Typically, users provide details regarding their current location, an intended pickup location from which they can access the vehicle, an intended travel destination, and other pertinent information. To effectively manage the pool of shared vehicles against demand, location needs, vehicle service and maintenance needs, etc., a service provider often restricts shared vehicle usage to a designated service area (i.e., where a shared mobility provider operates). Thus, a user is required to access and to return the shared vehicle at locations within the bounds of the service area (e.g., to avoid a monetary penalty or fee), which may affect the probability of finding available parking near a destination. In other words, not all available parking spaces may be factored into the parking guidance equation since some available parking spaces may be restricted for a shared vehicle. Moreover, shared vehicle operators regularly update their service areas for various reasons making the provision of shared vehicle parking search routes more difficult. For example, the boundaries of a shared vehicle service area may change due to any of the following: general coverage expansion plans (e.g., starting small and slowly expanding coverage in a city); specific events that benefit from such services; excluding some areas where there are problems (e.g., high theft or damage rates); increasing coverage where there is more demand created by users or by the removal of some previously existing operators; etc. Consequently, there is a need to provide parking search routes that take into consideration the operating area constraints as well as the dynamic distributions of shared vehicles during the course of a day.

To address these technical problems, a system 100 of FIG. 1 introduces a capability to provide a shared vehicle parking search route, according to one embodiment. In one embodiment, the system 100 of FIG. 1 may include one or more vehicles 101a-101n (also collectively referred to herein as vehicles 101) having connectivity to a routing platform 103 via the communication network 105. In one instance, the vehicles 101 are shared vehicles (e.g., a shared car, a shared bike, a shared scooter, a shared roller, etc.) that make up a pool or a fleet of a shared vehicle service provider and that may be manually-driven by users to navigate to one or more destinations within a service area 107. In one embodiment, the vehicles 101 may be configured with one or more vehicle sensors 109a-109n (also collectively referred to herein as vehicle sensors 109). In one instance, the vehicle sensors 109 (e.g., camera sensors, light sensors, light detection and ranging (LIDAR) sensors, radar, infrared sensors, thermal sensors, and the like) may acquire map data during an operation of the vehicle 101 within the service area 107. Although the vehicles 101 are depicted as automobiles, it is contemplated that the vehicles 101 may be any type of shared transportation.

In one embodiment, users may request access to the vehicles 101 by way of one or more user equipment (UE) 111a-111n (also collectively referred to herein as UEs 111) (e.g., a mobile device, an embedded navigation system, etc.) associated with a vehicle 101, a user or passenger of the vehicle 101, or a combination thereof. In one instance, the UEs 111 have connectivity to the routing platform 103 via the communication network 105 and include one or more applications 113a-113n (also collectively referred to herein as applications 113). By way of example, the applications 113 may include navigation applications, mapping applications, shared vehicle booking or reservation applications, parking applications, etc.

In one embodiment, the system 100 determines that a user is driving a shared vehicle 101 (e.g., a shared car) in route to a destination (e.g., her/his office 115). In one embodiment, the system 100 initiates a parking search route (PSR) while the user is in route to the destination 115. In one instance, the PSR may be initiated manually by the user as she/he approaches the destination 115. In one embodiment, the system 100 may initiate the PSR automatically based on the user's location relative to the destination 115 and/or to the border of the service area (e.g., service area 107). In one instance, the PSR may be presented to the user to provide her/him with guidance as to where the shared vehicle may be parked. In another instance, wherein the shared vehicle 101 is an autonomous or a semi-autonomous vehicle, the system 100 may present the PSR to the user so that the user knows what steps the shared vehicle 101 will be taking subsequently to maximize the user's comfort while riding within the vehicle.

In one embodiment, the system 100 generates the PSR from one or more existing parking prediction models. By way of example, the parking prediction models may be known models, computed models using historical data, computed models using real-time sensor data from vehicles (e.g., vehicles 101), best assumption for on-street parking (OSP), etc. In one instance, the system 100 determines the one or more existing prediction models based on information or data (e.g., historical data and/or real-time information) stored in or accessible via a geographic database (e.g., the geographic database 117). In one instance, the system 100 generates the PSR by providing a link cost based on the OSP probability of each link in a service area (e.g., the service area 107). In one embodiment, the system 100 may also generate the PSR based on one or more threshold parameters. For example, the system 100 may calculate the PRS based on a maximum PSR length (e.g., a set distance for the full sequence of links), a walking distance to ensure that the generated PSR does not stray too far away from a destination (e.g., the destination 115), etc. In one embodiment, the system 100 generates a PSR that is not limited to the service area (i.e., the PSR can go outside of those areas); however, the system 100 needs to consider that the vehicle 101 cannot be returned outside of the service area 107 (only at extra cost) hence such deviation by the system 100 needs to be used wisely (e.g., for reaching more quickly a street or route with a high probability of available parking). In one instance, when the user is getting closer to a given destination, the system 100 should calculate the PSR such that, all other routing factors being equal, the PSR passes inside the service area and not just outside, to ensure that if the user decides to opportunistically park when seeing a free spot, she/he can do so (which is only possible inside the service area). Consequently, in one embodiment, the system 100 removes one or more links that are outside of the service area from one or more potential shared vehicle parking candidates.

In one embodiment, the system 100 determines one or more shared vehicle boundary models and updates the PSR accordingly. In one instance, the boundaries of the service area are for each shared vehicle operator (or other relevant parameters that may have an impact on parking). By way of example, the boundaries may include inbound and outbound boundaries as well as link-based restrictions.

In one embodiment, the system 100 queries a current distribution of shared vehicles 101 in the service area 107. By way of example, the system 100 can determine one or more shared vehicle historical patterns (e.g., with a time of day/day of week) depending on the city and many other factors. As a result, in one embodiment, the PSR is time dependent and most importantly parking pattern dependent. For example, there may be a shared vehicle parking pattern during the workweek due to users commuting between the edges or outskirts and a city center. Consequently, the system 100 is likely to find a distribution of shared vehicles parked at or near the edges or boundaries of a service area in the mornings during the workweek and a distribution of shared vehicles parked at or near the center of the service area (e.g., a city center) in the evenings during the workweek.

In one instance, the system 100 determines the starting point of the PSR based on the current location of the distribution of parked shared vehicles 101. For example, if the system 100 determines that the pattern or distribution of parked shared vehicle 101 is at the edge (e.g., the edge of the service area 107), then the system 100 starts the PSR from inside of the service area 107 towards the destination 115. In other words, the system 100 starts the PSR at or near the location that the shared vehicles will be driven towards and will need to be parked. In one embodiment, if the system 100 is unable to determine a pattern or distribution of parked shared vehicles 101, then the system 100 will simply start the PSR at the destination (e.g., destination 115).

In one embodiment, the system 100 can rank the PSR links. By way of example, the PSR links may be ranked by the system 100 based on a probability of available parking spaces at a given time, day of the week, etc. In one embodiment, the system 100 can present the ranked PSR links to a user using one or more visual representations. For example, the system 100 may present the ranked PSR links to a user using a color coding (e.g., green equals a high probability of available parking, yellow equals a midlevel probability of available parking, and red equals a low probability of available parking). In one instance, the ranking of the PSR links may assist a user to quickly decide whether to park the shared vehicle at an available parking space or whether to continue driving further towards a destination in the hopes of finding closer parking, but at the risk of giving up the currently available space.

In one embodiment, the system 100 compares the PSR to current shared vehicle distribution objectives of one or more shared vehicle service providers and may update the PSR accordingly. By way of example, it may be in the best interest of a shared vehicle service provider to achieve a certain pattern of parked/available shared vehicles 101 during different times of the day (i.e., "load balancing"). For example, a denser pattern around the edges of the service area 107 and around public transit (PT) stations at night may mean that more shared vehicles will be available for commuters the next day (and paid for as soon as possible). In the daytime, the opposite goal applies, namely, a denser pattern towards the center of the service area 107.

In one embodiment, the system 100 can determine and/or attempt to achieve a distribution objective by including one or more preferred parking link(s) indicated by a shared vehicle service provider in the PSR. In other words, the PSR generated by the system 100 guides a user to park her/his shared vehicle 101 on or at a preferred link within the service area 107. In one embodiment, the system 100 can determine the preferred parking link(s) or desired distributions based on one or more inputs by a shared vehicle service provider. For example, the system 100 may determine the input via an embedded navigation system 111 associated with a vehicle 101. In another instance, the system 100 may determine the input automatically, periodically, on a schedule, etc. from information or data (e.g., historical data and/or real-time information) stored in or accessible via the geographic database 117.

In one instance, the system 100 can determine and/or attempt to achieve a distribution objective by altering the weight of on street parking (OSP) (probability) values on one or more links within the service area 107. As mentioned above, in one instance, the system 100 may generate the PSR by providing a link cost based on the OSP probability. Therefore, in one embodiment, the system 100 can artificially reduce the OSP probability and/or increase the associated cost and then update the PSR accordingly to minimize the likelihood of shared vehicles 101 being parked on that link. The inverse may also be true. For example, in one instance, the system 100 can artificially increase the OSP probability and/or decrease the associated cost and then update the PSR accordingly to maximize the likelihood of shared vehicles 101 being parked on that link. In one embodiment, once the system 100 updates the PSR according to the one or more vehicle distribution objectives, the system 100 can recalculate the PSR based on the current parking distribution or patterns within the service area 107. In one embodiment, once the PSR is updated (e.g., based on preferred parking links, adjusted OSP probabilities/link costs, etc.) accordingly, the system 100 can present the PSR to a user (e.g., via an embedded navigation system 111) to guide the user to the spots most beneficial to a shared vehicle service provider.

Consequently, drivers of shared vehicles 101 can increase their chances of finding parking places by being recommended a drivable path by the system 100 that considers parking availability as well as the shared vehicle 101 specific constraints (e.g., operating areas). Moreover, it is contemplated that while the system 100 can consider shared vehicle service provider requirements (e.g., "load balancing" requirements) as part of the ultimate PSR generation, a user's benefit is the predominate consideration.

Figure 2:
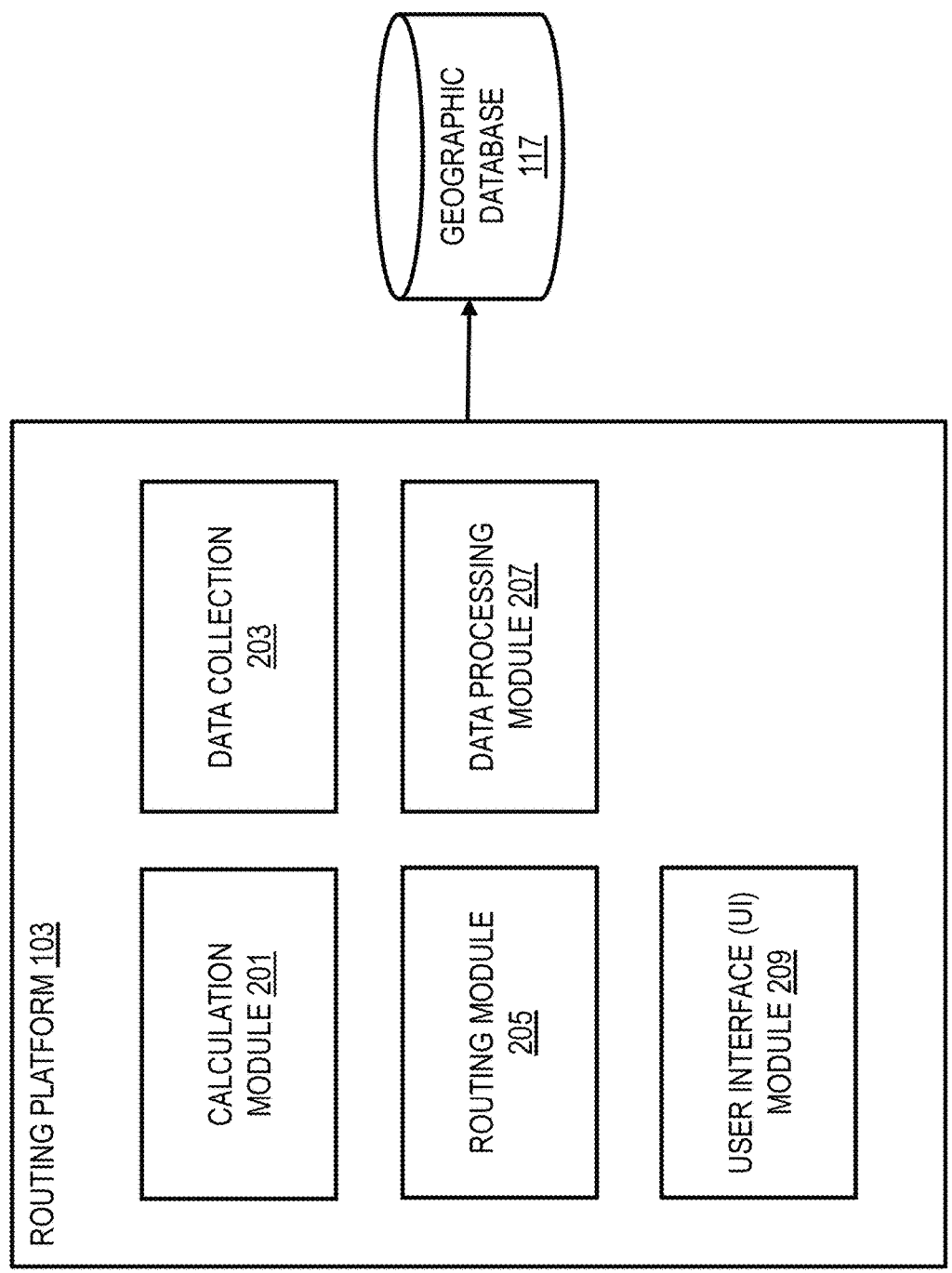
FIG. 2 is a diagram of the components of a routing platform, according to one embodiment.

FIG. 2 is a diagram of the components of the routing platform 103, according to one embodiment. By way of example, the routing platform 103 includes one or more components for providing a shared vehicle parking search route. It is contemplated that the functions of these components may be combined in one or more components or performed by other components of equivalent functionality. In one embodiment, the routing platform 103 includes a calculation module 201, a data collection module 203, a routing module 205, a data processing module 207, and a user interface (UI) module 209, with connectivity to the geographic database 117. The above presented modules and components of the routing platform 103 can be implemented in hardware, firmware, software, or a combination thereof. Though depicted as separate entities in FIG. 1, it is contemplated that the routing platform 103 may be implemented as a module of any of the components of the system 100. In another embodiment, the routing platform 103 and/or one or more of the modules 201-209 may be implemented as a cloud-based service, local service, native application, or combination thereof. The functions of the routing platform 103 and/or the modules 201-209 are discussed with respect to FIG. 3.

Figure 3:
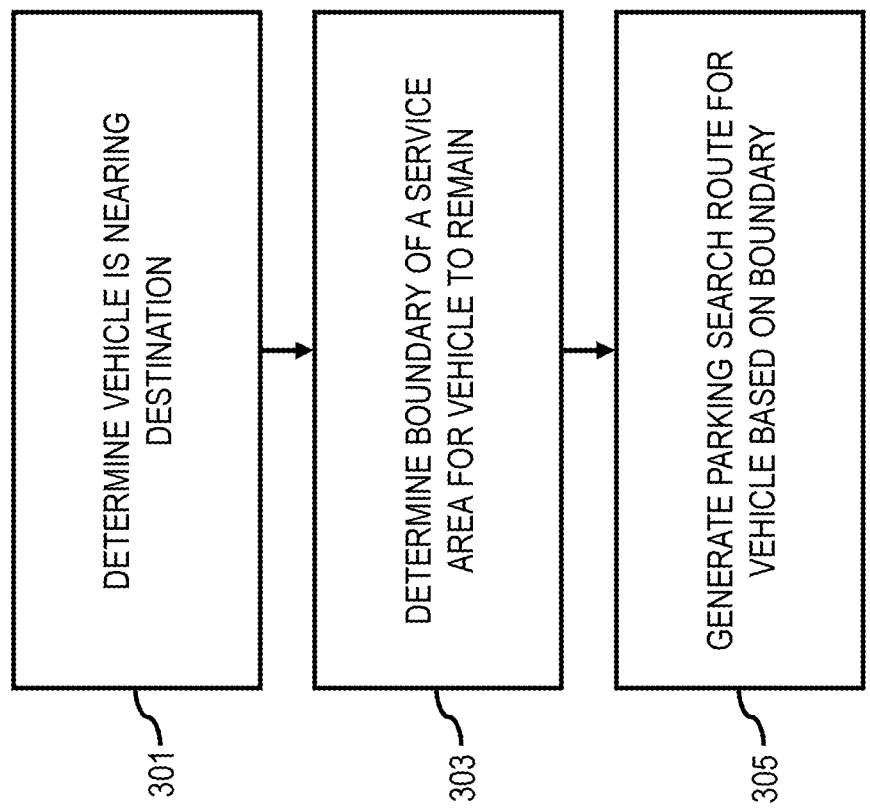
FIG. 3 is a flowchart of a process for providing a shared vehicle parking search route, according to one embodiment.
Figure 8:
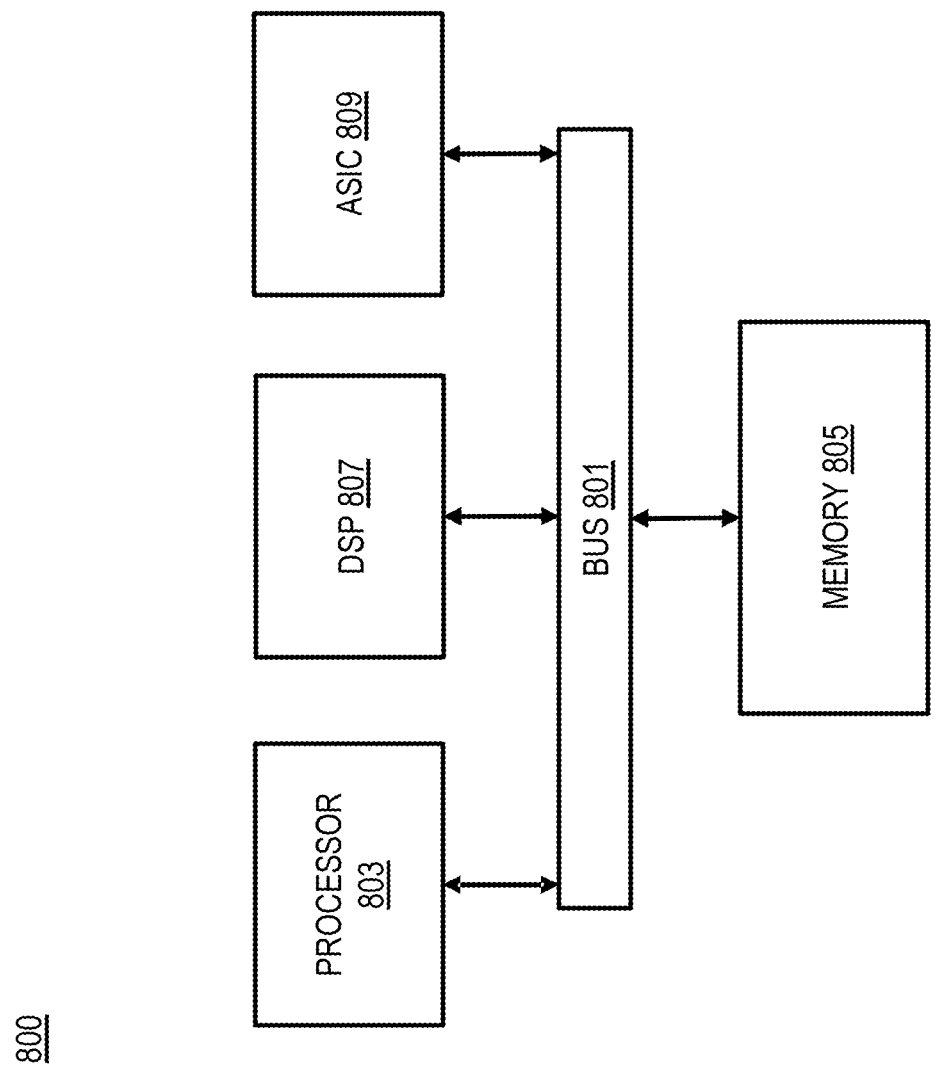
FIG. 8 is a diagram of a chip set that can be used to implement an embodiment.

FIG. 3 is a flowchart of a process for providing a shared vehicle parking search route, according to one embodiment. In various embodiments, the routing platform 103 and/or the modules 201-209 may perform one or more portions of the process 300 and may be implemented in, for instance, a chip set including a processor and a memory as shown in FIG. 8.

As such, the routing platform 103 and/or modules 201-209 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the calculation module 201 determines that a vehicle is nearing a destination. By way of example, the vehicle may be a shared vehicle (e.g., a shared car, a shared bike, a shared scooter, a shared roller, etc.). In one instance, the shared vehicle is part of a pool or a fleet of shared vehicles of a shared vehicle service provider or mobility operator. In one embodiment, the calculation module 201 determines the destination (e.g., a home, an office, a friend's house, etc.) based on a user manually setting or inputting the destination or location using an application 113 (e.g., a navigation application, a mapping application, a parking application, etc.) associated with a UE 111 (e.g., an embedded navigation system, a mobile device, or a combination thereof). In one instance, the destination may be within a service area (i.e., an area where a shared mobility provider operates) or the destination may be outside of the service area but close to the boundary.

In one embodiment, the calculation module 201 can then determine that a shared vehicle is nearing or crossing a threshold proximity to the destination based on one or more sensors associated with the vehicle (e.g., a GPS sensor 109). In one embodiment, the calculation module 201 can determine that a shared vehicle is nearing the destination based on a combination of one or more vehicle related inputs (e.g. location, speed, direction, etc.). For example, the calculation module 201 can determine that a shared vehicle 101 is driving much slower than the known speed limit, which may be indicative of a user looking for parking. In one instance, what constitutes being near a destination may be based on one or more temporal parameters (e.g., the time of day, day of the week, etc.). For example, in instances where a user is driving in the opposite direction of general commuting patterns and, therefore, there is a high likelihood of the user finding available parking at her/his destination, the calculation module 201 may determine that the vehicle is nearing the destination much later than if the user was driving in the direction of general commuting patterns and, therefore, there is a low likelihood of the user finding available parking at her/his destination.

In step 303, the data collection module 203 determines a boundary of a service area in which a vehicle (e.g., a shared vehicle) is to remain. By way of example, a boundary may consist of an inbound boundary, an outbound boundary, a link-based parking restriction, etc. In one instance, a boundary may delineate an area, region, or location where a shared vehicle 101 is restricted from parking. In another instance, a boundary may delineate an area, region, or location within the service area where a shared vehicle 101 is recommended to park or where it is advantageous for the shared vehicle 101 to park (e.g., in order to avoid additional charges or penalties). As described above, the location and/or dimensions of such boundaries and/or service areas can change regularly. For example, a shared vehicle operator may update a service area or boundary for various reasons (e.g., general coverage expansion plans, specific events, problems, etc.).

In one embodiment, wherein the vehicle is a shared vehicle 101 (e.g., a shared car), the data collection module 203 can determine or retrieve the service area, the boundary, or a combination thereof from a shared vehicle service operator. In one instance, the boundary of the service area is determined based on a cost to the shared vehicle. For example, parking the shared vehicle 101 inside or outside of the boundary may cause the user of the vehicle to incur additional costs or penalties or parking the shared vehicle inside or outside of the boundary may provide the user with a cost savings. In one embodiment, the boundary of the service area is an area in which the vehicle is to remain and/or should avoid leaving (e.g., leaving may cause the user to incur an extra cost or penalty). In one embodiment, a shared vehicle should only go outside of the boundary of the service area to reach more quickly a street with a high available parking probability. In one instance, the data collection module 203 may determine the boundary before the shared vehicle 101 is near the destination, or continuously, or independently of the shared vehicle 101.

In one embodiment, the data collection module 203 determines the boundary of the service area based on a target geographic distribution of the vehicle. In this instance, parking a shared vehicle outside of the boundary may cause the user to incur an additional cost or penalty. In one example, a user may receive a cost savings in exchange for parking the shared vehicle 101 in the determined boundary. For example, a shared vehicle service provider may want to achieve a dense pattern of parked shared vehicles 101 around the service area edges and around PT stations at nights so that more shared vehicles 101 will be available for commuters the next day. In another example, a shared vehicle service provide may want to achieve an availability of certain shared vehicles 101 at a location (e.g., shared cars to take home from a restaurant at night).

In one embodiment, once the calculation module 201 determines that a shared vehicle 101 is nearing a destination (e.g., a home or an office), the routing module 205 generates an initial parking search route without considering a boundary or service constraint (e.g., a target geographic distribution), wherein the initial parking search route includes a plurality of road links in proximity to the destination (e.g., the destination 115). In other words, the routing module 205 generates an ordinary parking search route (e.g., based on available parking probabilities). In one instance, the routing module 205 may generate the initial parking search route based on one or more existing parking prediction models. By way of example, the existing parking prediction models may be based on known parking data, historical data, real-time sensor data from vehicles, best on-street parking assumptions, etc. In one instance, the routing module 205 generates the initial parking search route by assigning a link cost based on the OSP probability to each link in a service area (e.g., the service area 107).

In step 305, the routing module 205 generates a parking search route for the vehicle (e.g., a shared vehicle 101) to locate a parking space in proximity to the destination based, at least in part, on the boundary (e.g., a target distribution). In other words, the routing module 205 updates the initial parking search route based on the boundary information. In one embodiment, the data processing module 207 removes one or more of the plurality of road links that are outside of the boundary of the service area from the initial parking search route to generate the parking search route. For example, the removal of the road links can prevent a shared vehicle 101 from being parked outside of the boundary. Alternatively, in another example, the data processing module 207 can remove one or more of the plurality of road links that are inside of the boundary from the initial parking search route to generate the parking search route such that the shared vehicle is prevented from being parked inside of the boundary. For example, if a shared vehicle service provider wants to prevent a shared vehicle 101 from being parked in certain high theft or high crime areas in proximity to a destination (e.g., where one or more street lights need repair).

In one embodiment, the routing module 205 generates the parking search route to locate the parking space inside of the boundary of the service area. By way of example, the boundary may be based on a target distribution. As described above, in many instances, a shared vehicle 101 cannot be returned or parked outside of the service area 107 without an extra cost. Therefore, in one instance, the routing module 205 can generate the parking search route to prevent a user of a shared vehicle 101 from leaving the service area 107 and/or incurring such costs.

In one instance, the data processing module 207 determines that a destination is within a threshold distance of the boundary of the service area. By way of example, the data processing module 207 may determine that the destination is within the threshold destination if the destination (e.g., a home) is at the edge or outskirts of the service area. In one embodiment, the routing module 205 then initiates the parking search route from inside the boundary of the service area towards the destination. In one instance, the routing module 205 initiates the parking search route from inside of the boundary when the data processing module 207 determines that there is a pattern or a distribution of parked shared vehicles 101 within the threshold distance of the boundary 107 (e.g., at or near the edge). It is contemplated that in such circumstances, the pattern of parked shared vehicles 101 is sparse inside of the boundary 107, but as time passes, the pattern will invert (i.e., eventually more shared vehicles 101 will be parked inside of the boundary 107 than at the edge).

In one embodiment, the routing module 205 generates the parking search route to locate the parking space inside a boundary of the service area to achieve a target geographic distribution. For example, it may be advantageous for shared vehicle service providers to achieve a dense pattern of parked shared vehicles 101 around the edges of the service area 107 and around public transit stations at night so that more shared vehicles 101 will be available for commuters the next day and so that a shared vehicle service provider can be paid as soon as possible. In one instance, rather than simply achieving a numerical density, the target geographic distribution may be based on a type of shared vehicle 101. For example, a shared car service provider may want to locate shared cars near a restaurant at night and shared bicycles near the restaurant during the day for the benefit of the restaurant customers.

In one instance, the UI module 209 receives an input specifying one or more preferred road links to achieve a target geographic distribution. By way of example, the input may be received from a shared vehicle service provider. In one embodiment, a shared vehicle service provider can input one or more preferred road links via an embedded navigation system of a shared vehicle (e.g., a UE 111 associated with a vehicle 101). In one embodiment, the data processing module 207 then adjusts a parking availability probability, an associated cost (e.g., a link cost based on the OSP probability), or a combination thereof for the one or more preferred road links to generate the parking search route. For example, a service provider may want to alter the weight of OSP (probability) values to influence the PSR based on its own shared vehicle distribution needs. The routing module 205, in one instance, then generates the parking search route based on the boundary or service constraint being used as a routing parameter of a navigation system (e.g., an embedded navigation system 111).

Figure 4A:
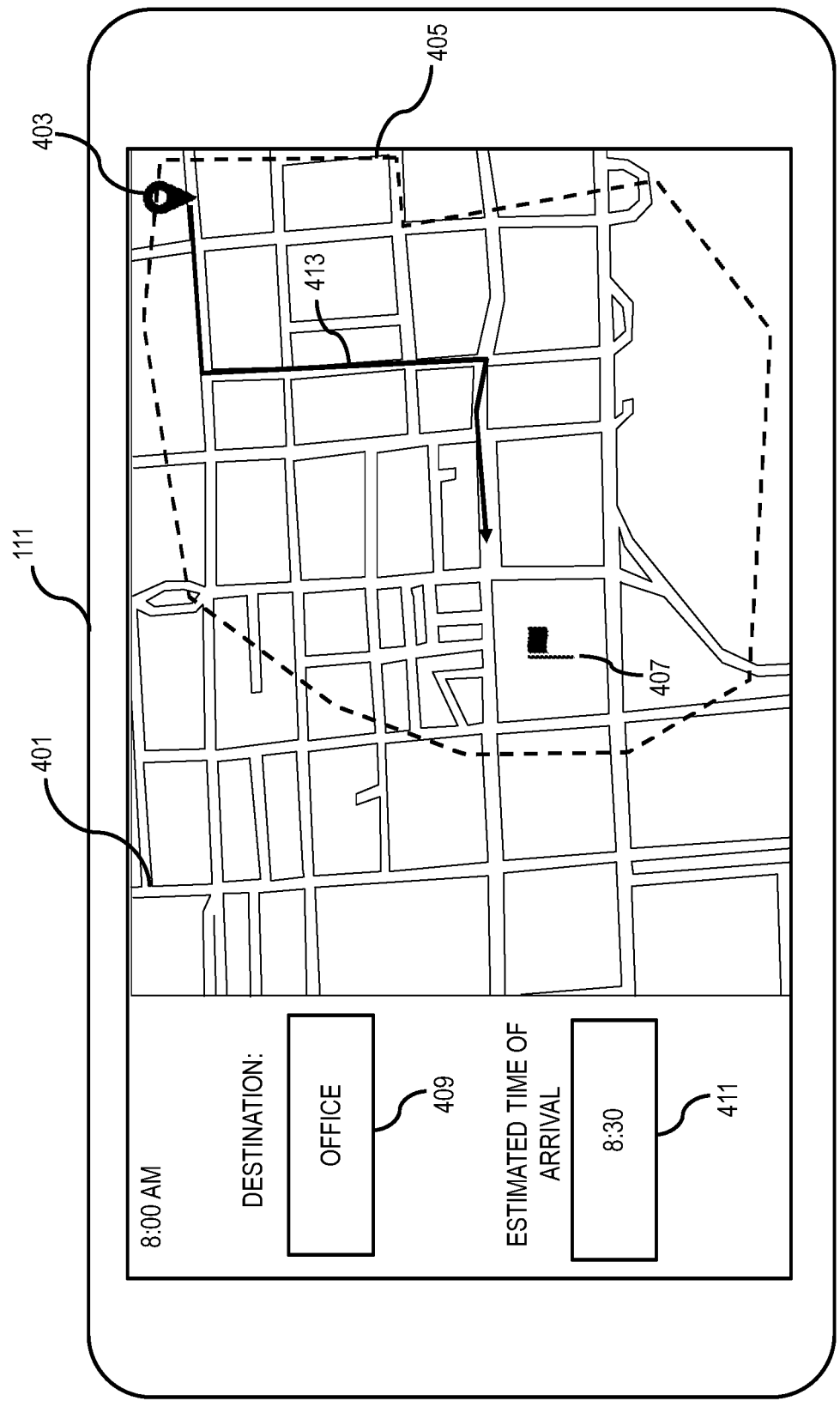
FIGS. 4A through 4F are diagrams of example user interfaces for providing a shared vehicle parking search route, according to one embodiment.

FIGS. 4A through 4F are diagrams of example user interfaces for providing a shared vehicle parking search route, according to one embodiment. Referring to FIG. 4A, a UI 401 (e.g., a navigation application 113) is generated for a UE 111 (e.g., an embedded navigation system, a mobile device, or a combination thereof) that enables a user to obtain parking search assistance in connection with a shared vehicle 101 (e.g., a shared car). In this example, a user may want to take the shared vehicle 101 from her/his current location 403 (e.g., home) near the outer edge of the service area 405 to her/his office 407 in the city center. In this example, the user plans to drive to the shared vehicle 101 in the morning (e.g., at 8:00 AM), a time that is historically difficult to find on-street parking in the city center. As with many cites, there is a tendency that people drive towards the city centers in the morning and then leave the city and drive towards the outskirts in the evening. Consequently, during the workweek, there is a dense distribution of shared vehicles 101 available in the morning near the user's current location 403, which is at the edge or boundary of the service area 405. In one embodiment, the UI 401 includes an input 409 to enable the user to manually input the desired destination (e.g., "office") and the UI 401 can include a display 411 that shows the user the estimated time of arrival at the given destination (e.g., at 8:30 AM). In one embodiment, the system 100 can provide the user with route guidance 413 in the UI 401 before and/or in conjunction with a parking search route.

Figure 4B:
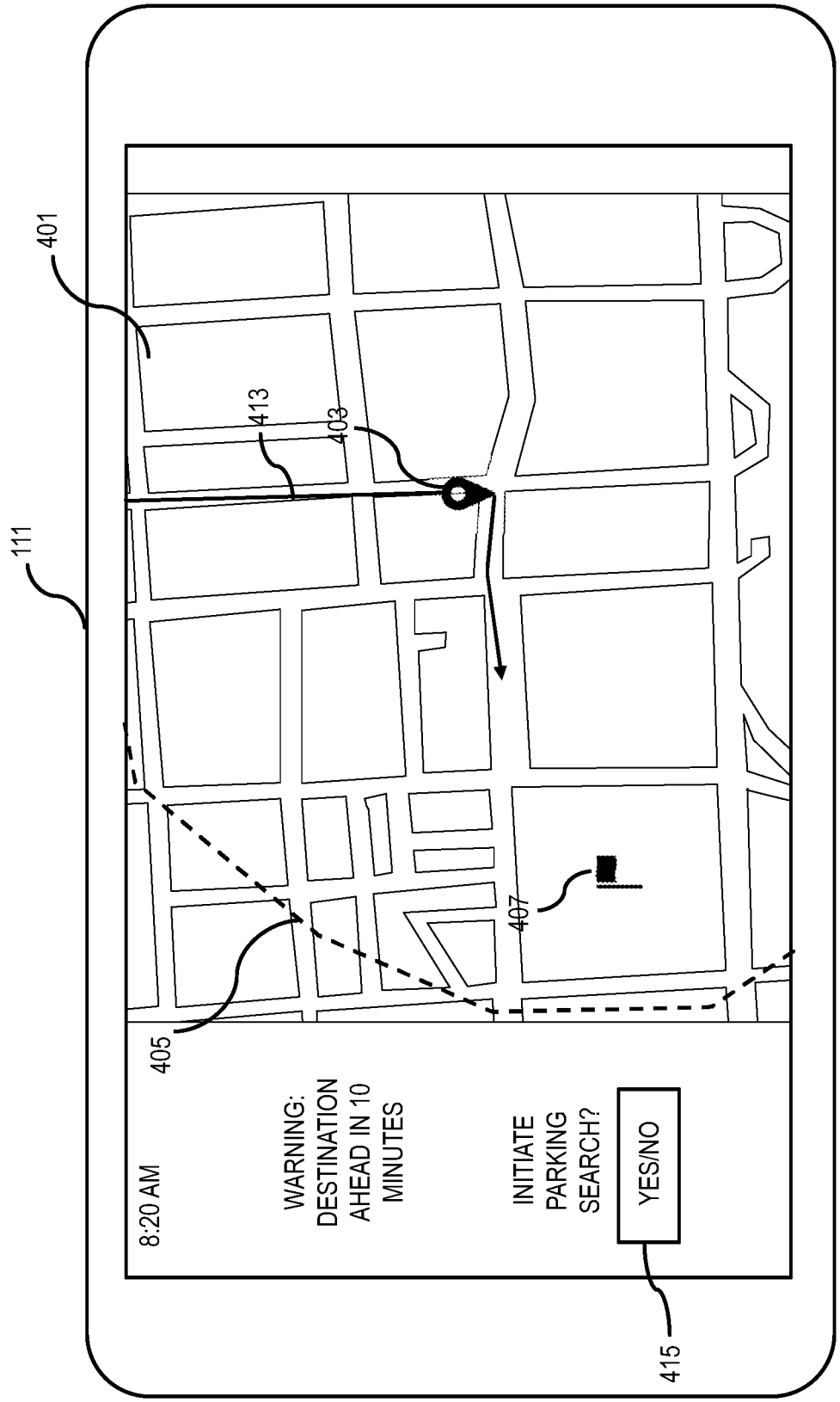

In one embodiment, the system 100 can determine that the user is approaching or nearing the destination 407, which is close to the border of the service area 405. In one instance, the system 100 can determine that the user's location 403 along the route 413 based on one or more vehicle sensors 109 (e.g., GPS sensors) and/or one or more vehicle-based inputs (e.g., driving slower than the posted speed limit, stopping longer than normal, etc.). As a result, in one embodiment, the system 100 can warn the user that the destination is approaching (e.g., "warning destination ahead in 10 minutes"), as depicted in FIG. 4B.

In one embodiment, the system 100 generates the UI 401 such that it includes an input 415 to enable the user to manually initiate the system 100 to generate a parking search route. For example, while the user may be generally familiar with parking around her/his office (e.g., destination 407), in this example, the user is driving a shared vehicle 101 that may be restricted by one or more operating constraints unlike a personal or privately-owned vehicle (e.g., restricted parking spaces for load balancing purposes). In this example, the driver uses the input 415 to prompt the system 100 to generate the parking search route (e.g., by tapping or touching "yes").

Figure 4C:
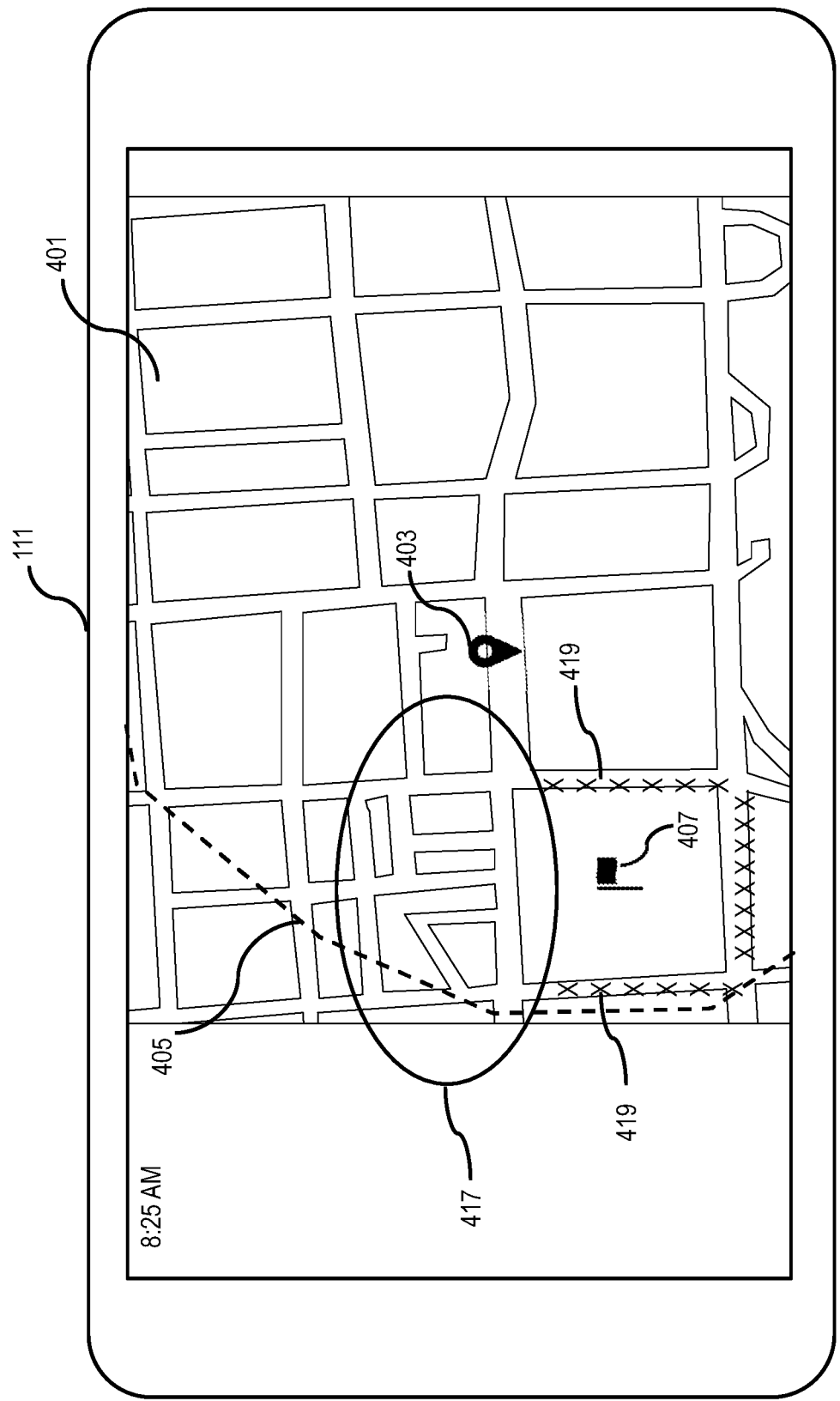

In one embodiment, the system 100 generates the parking search route based on a boundary of a service area (e.g., from a shared vehicle service provider). In this example, the shared vehicle 101 is part of a pool or a fleet of shared vehicles 101 operated by a mobility operator that is attempting to load balance the shared vehicles 101 that it operates near the edge of the service area 405 so that its shared vehicles 101 will be readily available to users leaving the office complex 407 (e.g., on their way home). By way of example, a shared vehicle service provider may want to create a density of parked shared vehicles 101 within the region 417, as depicted in FIG. 4C. One way that the service provider can achieve this distribution is by restricting parking on the nearby or surrounding links 419. In this instance, the region 417 may be considered a preferred area in terms of parking the shared vehicle 101 and the links 419 may be considered prohibited or restricted areas in terms of parking the shared vehicle 419. Consequently, the system 100 will remove the links 419 from potential parking space candidates or may increase the cost of the links 419 so that they are not included or not recommended in the generated parking search route.

Figure 4D:
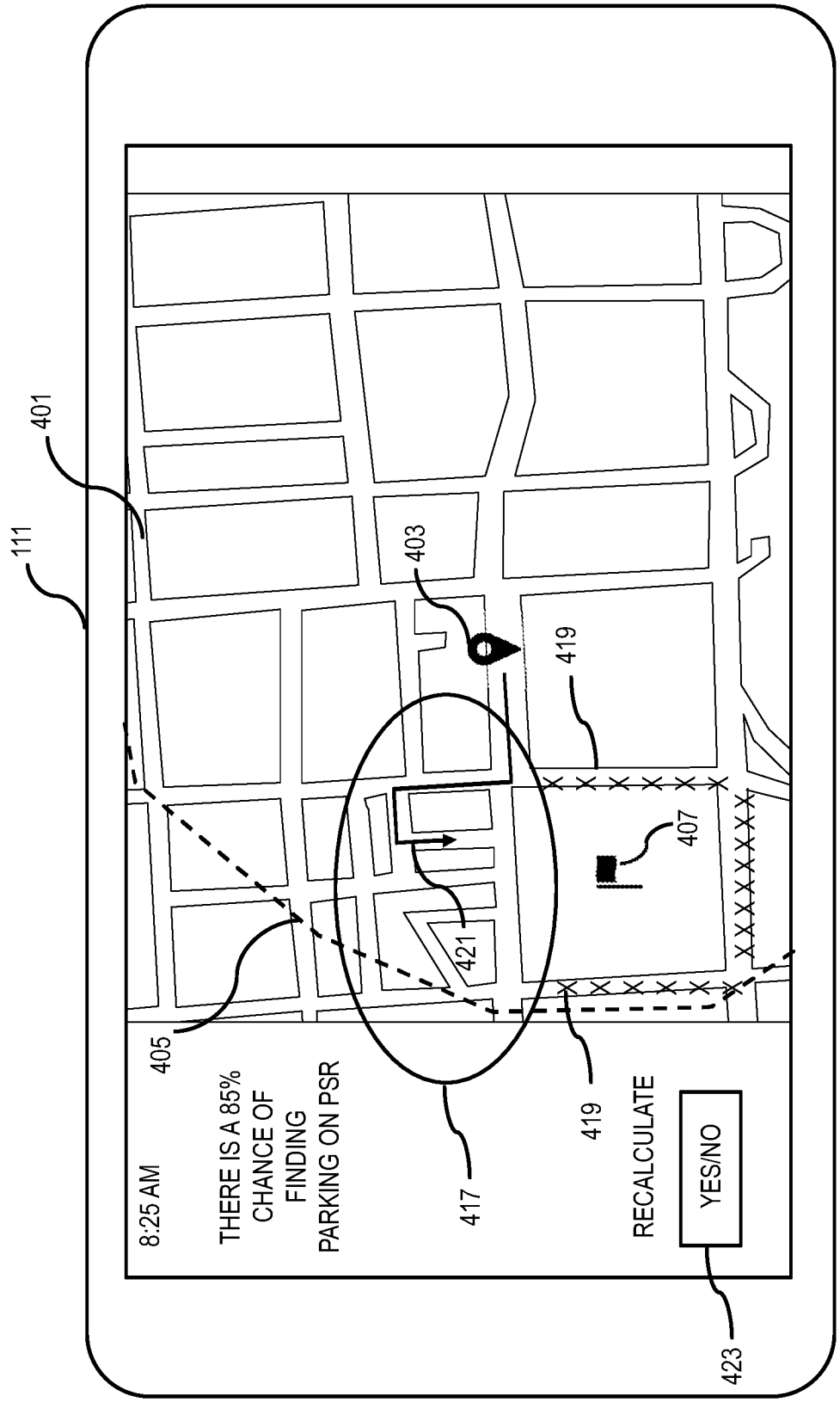

In one embodiment, the system 100 generates a parking search route 421 for the shared vehicle 101 to locate a parking space in proximity to the destination 407 based on the boundary (e.g., within region 417 and/or away from restricted links 419), as depicted in FIG. 4D. In one instance, the system 100 can generate the UI 401 such that a user can see an estimation of her/his likelihood of finding an available parking space based on the generated PSR 421 (e.g., 85% chance of finding a parking space"). In one embodiment, the system 100 may generate the UI 401 with an input 423 so that the user can initiate the system 100 to recalculate the parking search route (e.g., based on a change in the user's location, a passage of time, etc.).

Figure 4E:
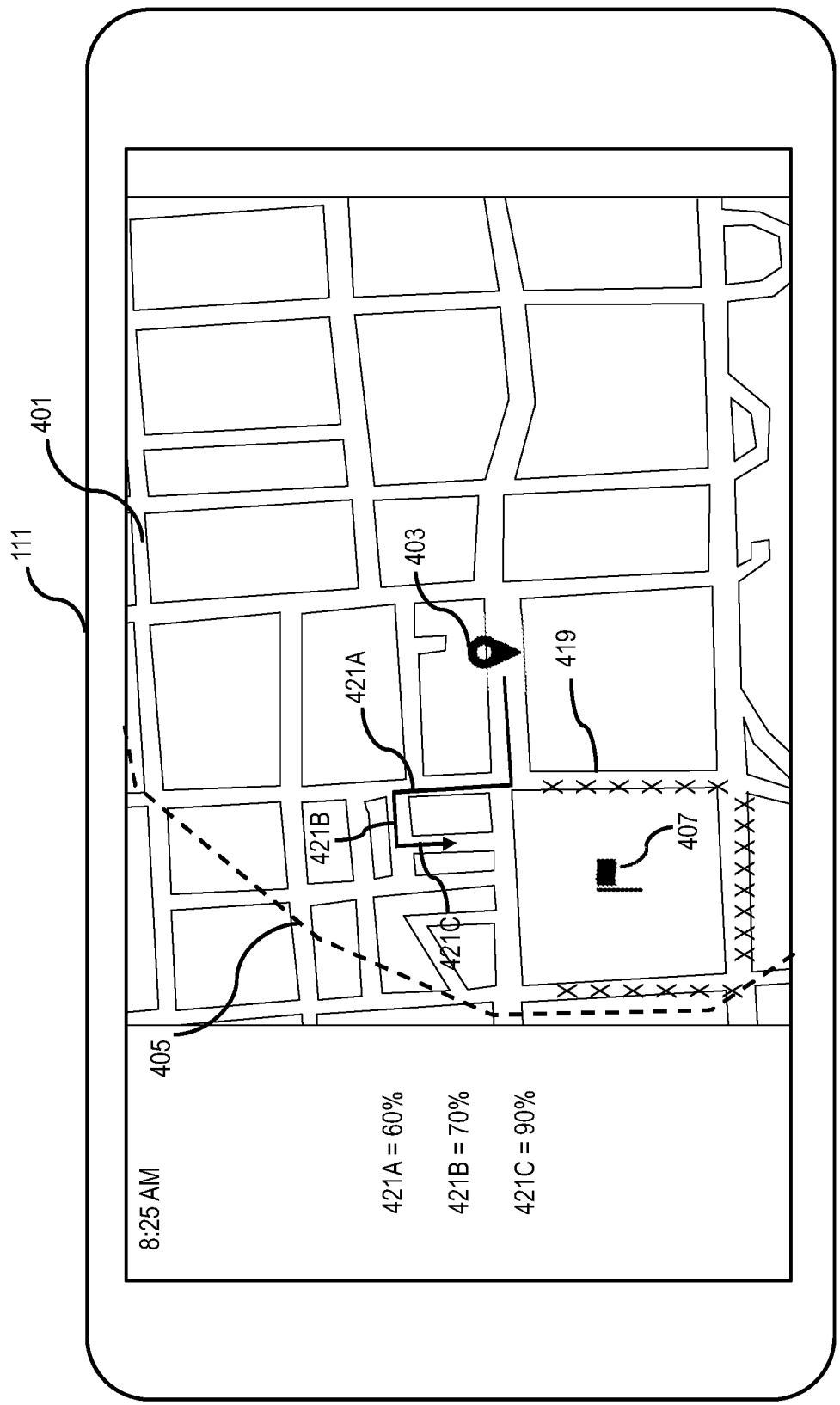

In one instance, the system 100 can rank one or more links along the parking search route 421 (e.g., based on historical probabilities), as depicted in FIG. 4E. In one embodiment, the system 100 can generate the parking search route 421 in the UI 401 so that each portion of the route is visually ranked for the user (e.g., color coded). For example, in this instance, the portion 421A may have a 60% probability of having available parking; the portion 421B may have a 70% probability of having available parking; and the portion 421C may have a 90% probability of having available parking (e.g., the shared vehicle service provider may have two reserved spots on portion 421C).

Figure 4F:
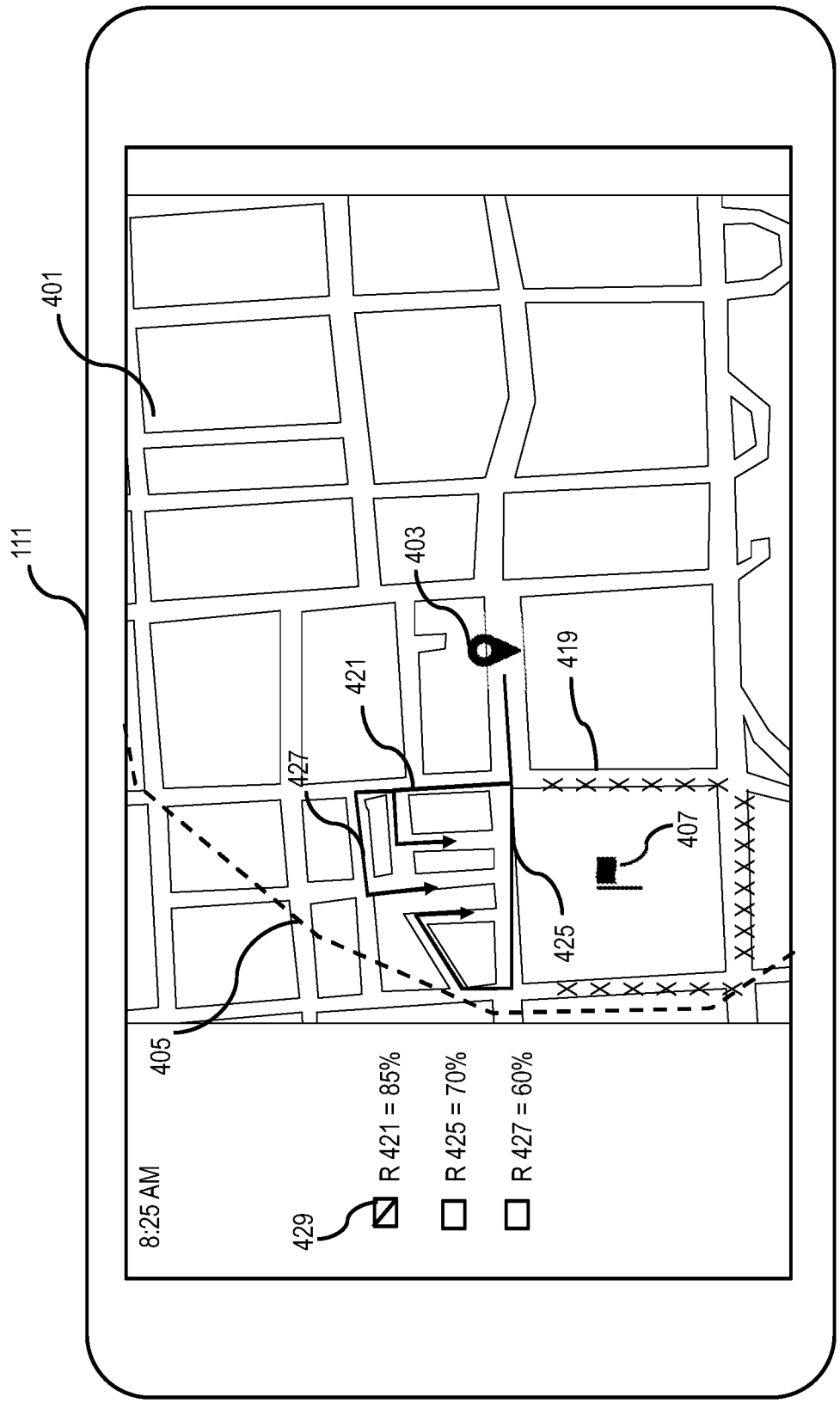

In one embodiment, the system 100 can rank one or more parking search routes (e.g., based on historical probabilities). In one instance, the system 100 can generate the parking search routes 421, 425, and 427 so that each route is visually ranked (e.g., color coded), as depicted in FIG. 4F. For example, in this instance, the parking search route 421 may have an 85% probability of available parking; the parking search route 425 may have a 70% probability of available parking; and the parking search route 427 may have a 60% probability of available parking. It is contemplated that the system 100 can employ any visual representations that may enable a user to quickly identify which parking search route or one or more links along a parking search route among the possible options is best suited for her/his needs. In one embodiment, the UI 401 may include one or more inputs 429 that can enable a user to select her/his preferred parking search route (e.g., route 421). In one instance, the system 100 may enable the user to interact with the parking search route via the UI 401 (e.g., tapping or touching the route), through one or more voice commands, or a combination thereof.

Figure 5B:
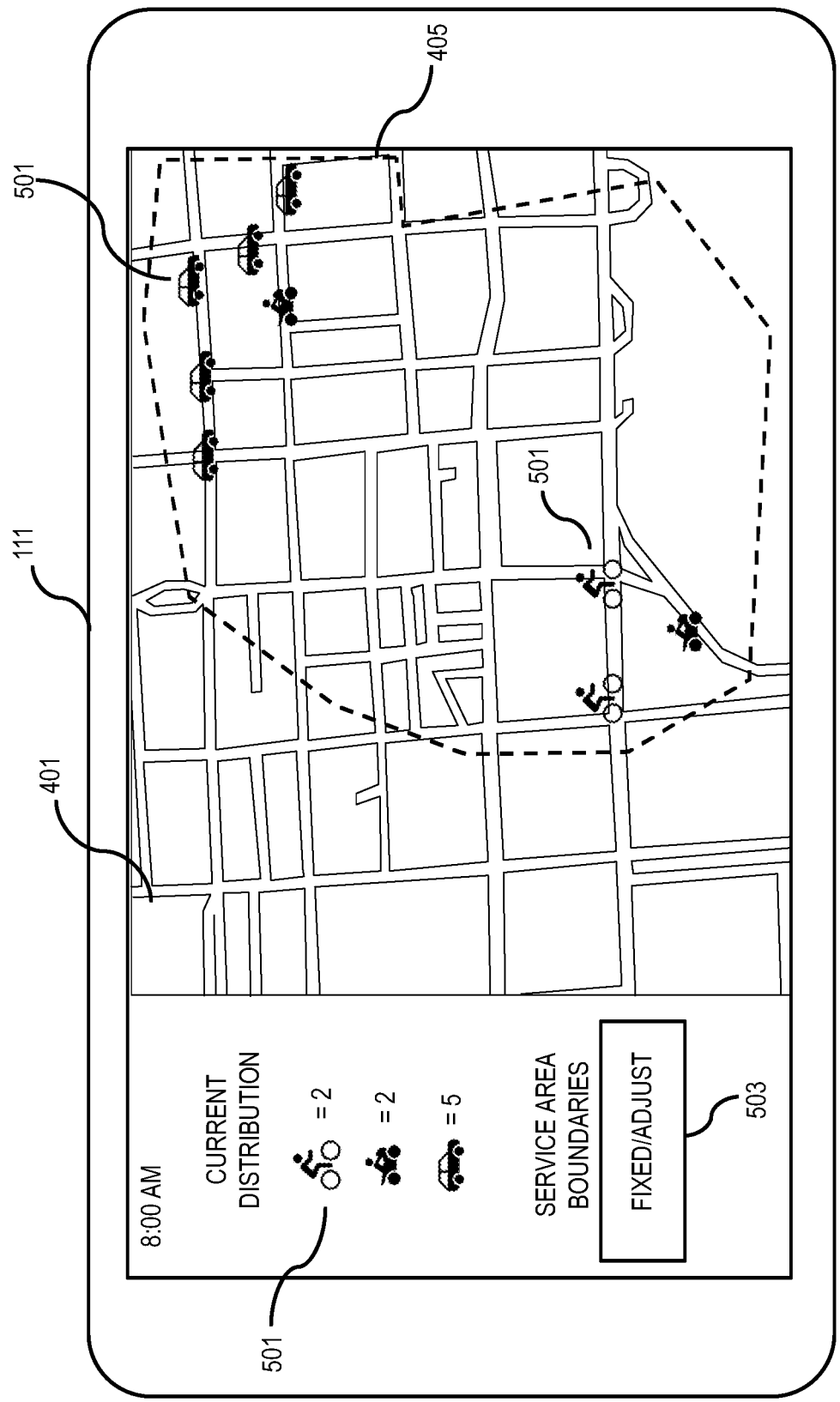
Figure 5C:
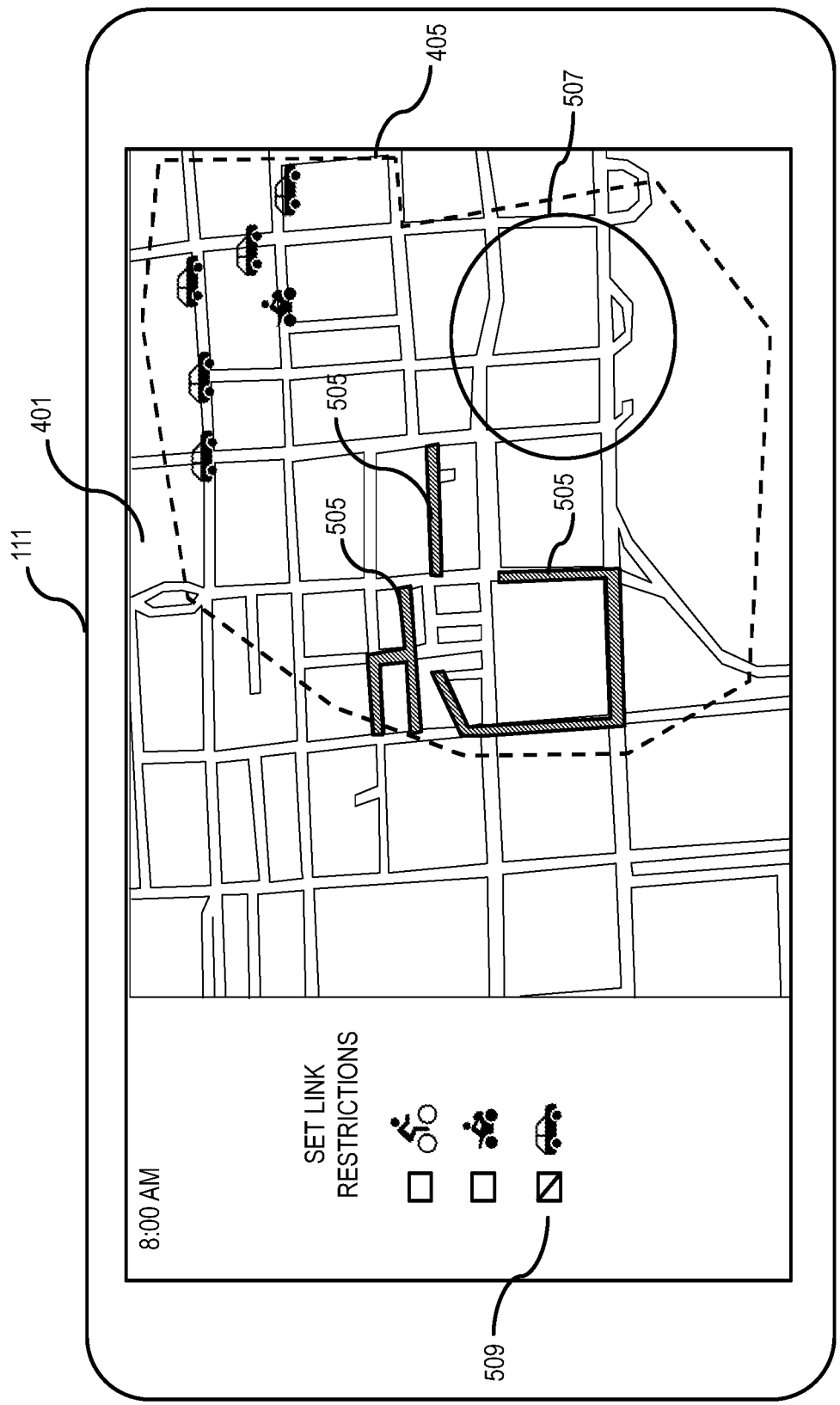

FIGS. 5A through 5C are diagrams of example user interfaces for inputting one or more shared vehicle parking search route parameters, according to one embodiment. Referring to FIG. 5A, the UI 401 (e.g., a navigation application 113) generated for a UE 111 (e.g., an embedded navigation system, a mobile device, or a combination thereof) may also be used by a shared vehicle service provider to input one or more boundaries or service constraints that the system 100 can then use to generate the parking search route as described above. In one instance, the system 100 can present one or more visual distributions of the shared vehicles 101 (e.g., as shown by the icons 501) to a user (e.g., a shared vehicle service provider) via the UI 401. For example, the UI 401 may include the number, the location, the type, or a combination thereof of the one or more shared vehicles 101 in a shared vehicle service provider's fleet or pool. In this example, a shared vehicle service provider can view the number of shared cars (5), shared scooters (2), and shared bicycles (2) in its fleet as well as their respective locations within the relative service area or boundary 405. In one instance, the system 100 may enable a user to interact with the various shared vehicle icons 501 (e.g., by tapping or touching) to learn more about the specific shared vehicle 101 represented by the icon 501 (e.g., to view the type of shared car).

In one embodiment, the system 100 can enable a user (e.g., a shared vehicle service provider) to manually input one or more boundaries or service constraints for generating the parking search route. In one instance, the system 100 may generate the UI 401 such that it includes an input 503 that can enable a shared vehicle service provider to adjust or set a service area or boundary (e.g., the boundary 405), as depicted in FIG. 5B. In one embodiment, the system 100 can generate the UI 401 so that a user can manually select restricted links (e.g., by touching or tapping) to be removed from the parking route search (e.g., restricted links 505), as depicted in FIG. 5C. In one instance, the system 100 can generate the UI 401 so that a user (e.g., a shared vehicle service provider) can quickly "draw" a preferred or prohibited region 507 around an area within its service area 405. In one instance, the system 100 can generate the UI 401 with an input 509 that can enable a user (e.g., a shard vehicle service provider) to select the one or more restricted links 505 or regions 507 based on a shared vehicle type (e.g., shared cars).

Returning to FIG. 1, in one embodiment, the UEs 111 can be associated with any of the vehicles 101 (e.g., a shared car), a person traveling within a vehicle 101, or a shared vehicle service provider. By way of example, the UEs 111 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 111 can support any type of interface to the user (such as "wearable" circuitry, etc.). In one embodiment, the vehicles 101 may have cellular or wireless fidelity (Wi-Fi) connection either through the inbuilt communication equipment or from a UE 111 associated with the vehicles 101. Also, the UEs 111 may be configured to access the communication network 105 by way of any known or still developing communication protocols. In one embodiment, the UEs 111 may include the routing platform 103 to provide a shared vehicle parking search route.

In one embodiment, the routing platform 103 performs the process for providing a shared vehicle parking search route as discussed with respect to the various embodiments described herein. In one embodiment, the routing platform 103 can be a standalone server or a component of another device with connectivity to the communication network 105. For example, the component can be part of an edge computing network where remote computing devices (not shown) are installed along or within proximity of an intended destination (e.g., a city center).

In one embodiment, the routing platform 103 has connectivity over the communication network 105 to the services platform 119 (e.g., an OEM platform) that provides one or more services 121a-121n (also collectively referred to herein as services 121) (e.g., shared vehicle routing services). By way of example, the services 121 may also be other third-party services and include mapping services, navigation services, travel planning services, reservation services (e.g., booking a shared vehicle 101), notification services, social networking services, content (e.g., audio, video, images, etc.) provisioning services, application services, storage services, contextual information determination services, location-based services, information-based services (e.g., weather, news, etc.), etc.

In one embodiment, content providers 123a-123n (also collectively referred to herein as content providers 123) may provide content or data (e.g., on-street parking probabilities, navigation-based content such as destination information, routing instructions, POI related data, historical data, shared vehicle content such as vehicle type, vehicle operator, etc.) to the vehicles 101, the routing platform 103, the UEs 111, the applications 113, the geographic database 117, the services platform 119, and the services 121. The content provided may be any type of content, such as map content, contextual content, audio content, video content, image content, etc. In one embodiment, the content providers 123 may also store content associated with the vehicles 101, the routing platform 103, the UEs 111, the applications 113, the geographic database 117, the services platform 119, and/or the services 121. In another embodiment, the content providers 123 may manage access to a central repository of data, and offer a consistent, standard interface to data, such as a repository of the geographic database 117.

By way of example, as previously stated the vehicle sensors 109 may be any type of sensor. In certain embodiments, the vehicle sensors 109 may include, for example, a global positioning sensor (GPS) for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., lights or exhaust associated with a vehicle 101 leaving a parking spot), velocity sensors, and the like. In another embodiment, the vehicle sensors 109 may include sensors (e.g., mounted along a perimeter of the vehicle 101) to detect the relative distance of the vehicle from lanes or roadways, the presence of other vehicles 101, pedestrians, animals, traffic lights, road features (e.g., curves) and any other objects, or a combination thereof. In one scenario, the vehicle sensors 109 may detect weather data, traffic information, or a combination thereof. In one example embodiment, the vehicles 101 may include GPS receivers to obtain geographic coordinates from the satellites 125 for determining current or live location and time. Further, the location can be determined by a triangulation system such as A-GPS, Cell of Origin, or other location extrapolation technologies when cellular or network signals are available. In another example embodiment, the services 121 may provide in-vehicle navigation services.

The communication network 105 of system 100 includes one or more networks such as a data network, a wireless network, a telephony network, or any combination thereof.

It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the routing platform 103 may be a platform with multiple interconnected components. By way of example, the routing platform 103 may include multiple servers, intelligent networking devices, computing devices, components and corresponding software for providing a shared vehicle parking search route. In addition, it is noted that the routing platform 103 may be a separate entity of the system 100, a part of the services platform 119, the services 121, or the content providers 123.

In one embodiment, the geographic database 117 can store information regarding a shared vehicle 101 or mobility operator service constraints, service area boundaries (e.g., inbound and outbound boundaries, restricted parking links, etc.), existing parking prediction models (e.g., known, computed using historical data, computed using real-time sensor data from vehicles 101, best on-street parking assumptions, etc.), one or more shared vehicle temporal patterns (e.g., day and night parking patterns), user preferences, shared vehicle service provider demand models, or a combination thereof. The information may be any of multiple types of information that can provide means for providing a shared vehicle parking search route. In another embodiment, the geographic database 117 may be in a cloud and/or in a vehicle 101, a UE 111, or a combination thereof.

By way of example, the vehicles 101, the routing platform 103, the vehicle sensors 109, the UEs 111, the applications 113, the geographic database 117, the services platform 119, the services 121, the content providers 123, and the satellites 125 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
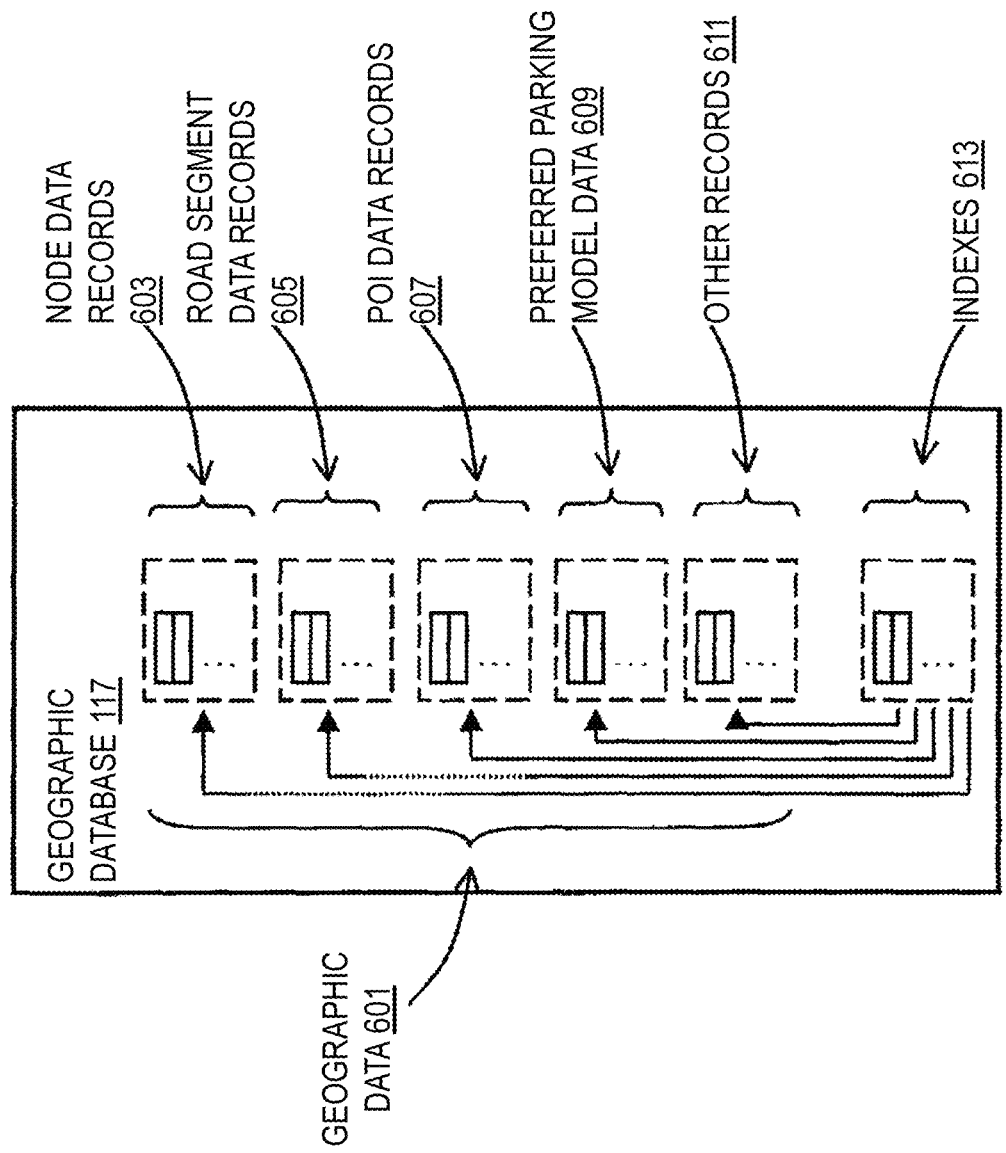
FIG. 6 is a diagram of a geographic database, according to one embodiment.

FIG. 6 is a diagram of a geographic database, according to one embodiment. In one embodiment, parking search route information and/or any other information user or generated by the system 100 with respect to providing a shared vehicle parking search route can be stored, associated with, and/or linked to the geographic database 117 or data thereof. In one embodiment, the geographic or map database 117 includes geographic data 601 used for (or configured to be compiled to be used for) mapping and/or navigation-related services, such as for route information, service information, on-street parking probability information, estimated time of arrival information, location sharing information, speed sharing information, and/or geospatial information sharing, according to exemplary embodiments. For example, the geographic database 117 includes node data records 603, road segment or link data records 605, POI data records 607, preferred parking model data 609, other data records 611, and indexes 613, for example. More, fewer or different data records can be provided. In one embodiment, the other data records 611 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI data records 607 may also include information on locations of traffic controls (e.g., stoplights, stop signs, crossings, etc.), driving restrictions (e.g., speed, direction of travel, etc.), parking restrictions (e.g., side of street, day of week, etc.), or a combination thereof.

In one embodiment, geographic features, e.g., two-dimensional or three-dimensional features, are represented using polygons, e.g., two-dimensional features, or polygon extrusions, e.g., three-dimensional features. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in geographic database 117.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes, e.g., used to alter a shape of the link without defining new nodes.

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary, e.g., a hole or island. In one embodiment, a polygon is constructed from one outer simple polygon and none or at least one inner simple polygon. A polygon is simple if it just consists of one simple polygon, or complex if it has at least one inner simple polygon.

In one embodiment, geographic database 117 follows certain conventions. For example, links do not cross themselves and do not cross each other except at a node. Also, there are no duplicated shape points, nodes, or links. Two links that connect each other have a common node. In geographic database 117, overlapping geographic features are represented by overlapping polygons. When polygons overlap, the boundary of one polygon crosses the boundary of the other polygon. In geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In exemplary embodiments, the road segment data records 605 are links or segments representing roads, streets, or paths, as can be used in the determining boundaries of the service areas for each shared vehicle operator (or other relevant operator restrictions which may have an impact on parking) (e.g., link-based restrictions). The node data records 603 are end points corresponding to the respective links or segments of the road segment data records 605. The road link data records 605 and the node data records 603 represent a road network, such as used by shared vehicles (e.g., cars, bicycles, scooters, etc.) and/or other entities. Alternatively, the geographic database 117 can contain path segment and node data records or other data that represent pedestrian paths, bicycle paths, or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs (e.g., general or personal POIs), such as home, office, a friend's house, gasoline stations, hotels, restaurants, museums, stadiums, offices, automobile dealerships, auto repair shops, buildings, stores, parks, etc. The geographic database 117 can include data about the POIs and their respective locations in the POI data records 607. In one instance, the POI data records 607 can include information regarding popular times at a POI, how long people typically spend at a POI, opening and closing times of a POI, etc. The geographic database 117 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In one embodiment, the geographic database 117 can also include preferred parking model data 609. By way of example, the preferred parking model data 609 may include preferred parking link(s), adjusted on-street probability values, demand models, etc. that can enable a shared vehicle service provider to geographically distribute their shared vehicles 101 (e.g., cars, bicycles, scooters, rollers, etc.) to maximize their chances of being used and/or paid as soon as possible. In one embodiment, the preferred parking model data 609 may include historical and/or temporal patterns affecting shared vehicle 101 parking in a service area. In one instance, the preferred parking model data 609 may include owners and/or operators of shared vehicles in the given area. In another embodiment, the preferred parking model data 609 stores information relating to the one or more shared vehicles 101, e.g., vehicle type, vehicle features, ratings and/or reviews, etc. By way of example, the preferred parking model data 609 can be associated with one or more of the node data records 603, road segment data records 605, and/or POI data records 607 to support localization and opportunistic use of the shared vehicles during commuting.

In one embodiment, the indexes 613 may improve the speed of data retrieval operations in geographic database 117. In one embodiment, the indexes 613 may be used to quickly locate data without having to search every row in geographic database 117 every time it is accessed. For example, in one embodiment, the indexes 613 can be a spatial index of the polygon points associated with stored feature polygons.

In one embodiment, the geographic database 117 can be maintained by a content provider 123 in association with the services platform 119, e.g., a map developer. The map developer can collect geographic data to generate and enhance geographic database 117. There can be different ways used by the map developer to collect data. These ways can include obtaining data from other sources, such as municipalities or respective geographic authorities. In addition, the map developer can employ field personnel to travel by vehicle (e.g., a shared vehicle 101) and/or travel with a UE 111 along roads throughout the geographic region to observe features and/or record information about them, for example. Also, remote sensing, such as aerial or satellite photography, can be used (e.g., using one or more satellites 125).

The geographic database 117 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 111 or a shared vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a shared vehicle parking search route may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
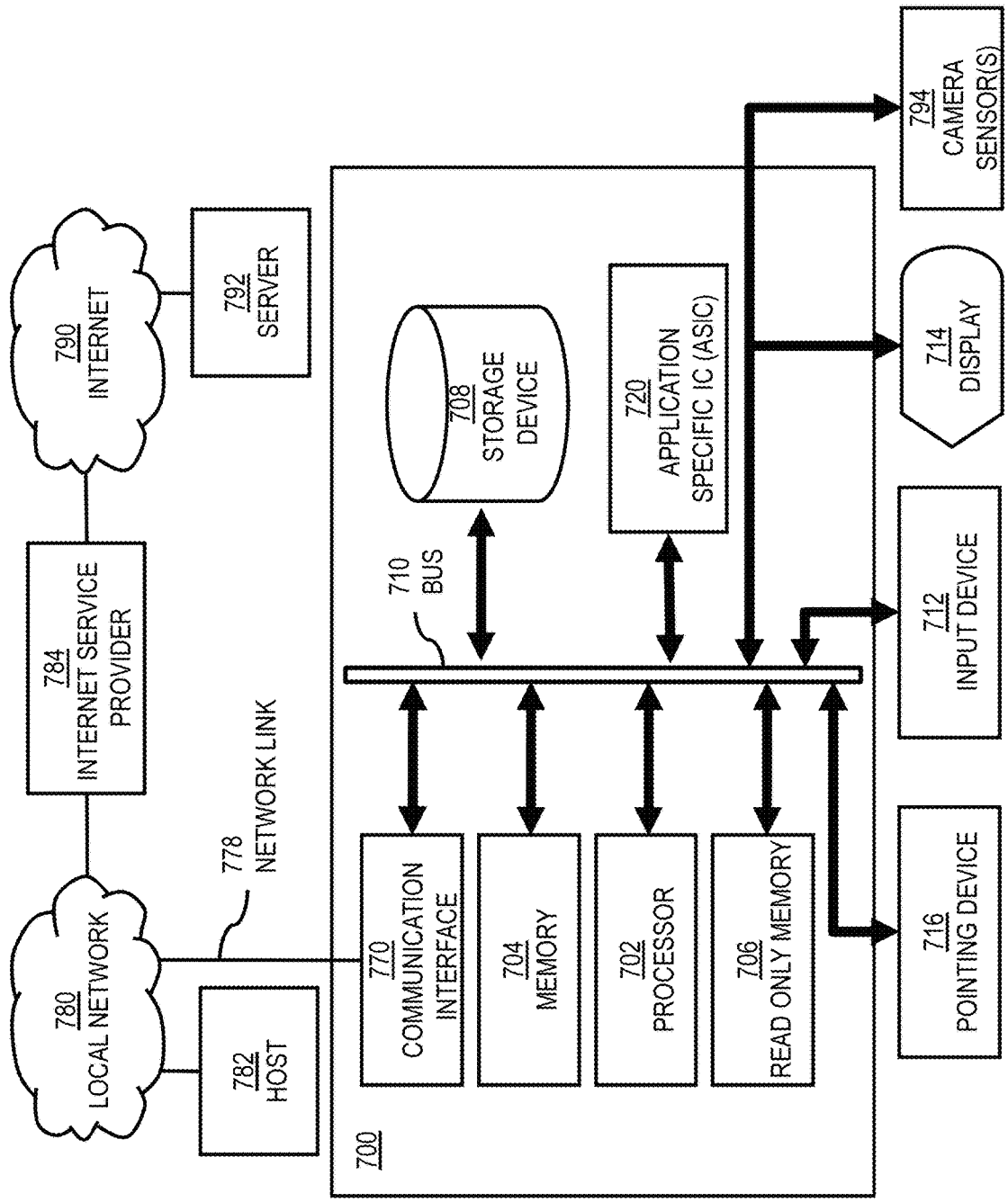
FIG. 7 is a diagram of hardware that can be used to implement an embodiment.

FIG. 7 illustrates a computer system 700 upon which an embodiment may be implemented. Computer system 700 is programmed (e.g., via computer program code or instructions) to provide a shared vehicle parking search route as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing a shared vehicle parking search route. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random-access memory (RAM) or other dynamic storage device, stores information including processor instructions for providing a shared vehicle parking search route. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a shared vehicle parking search route, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general, the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a shared vehicle parking search route.

The term non-transitory computer-readable medium is used herein to refer to any medium that participates in providing information to processor 702, including instructions for execution. Such a medium may take many forms, including, but not limited to, non-volatile media, volatile media and transmission media. Non-volatile or non-transitory media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

In one embodiment, a non-transitory computer-readable storage medium carrying one or more sequences of one or more instructions (e.g., computer code) which, when executed by one or more processors (e.g., a processor as described in FIG. 5), cause an apparatus (e.g., the vehicles 101, the UEs 105, the routing platform 103, etc.) to perform any steps of the various embodiments of the methods described herein.

FIG. 8 illustrates a chip set 800 upon which an embodiment may be implemented. Chip set 800 is programmed to provide a shared vehicle parking search route as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a shared vehicle parking search route. The memory 805 also stores the data associated with or generated by the execution of the inventive steps.

FIG. 9 is a diagram of exemplary components of a mobile terminal 901 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), WiFi, satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide a shared vehicle parking search route. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable non-transitory computer readable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for generating a parking search route comprising:
  determining that a shared vehicle is nearing a destination;
  determining a boundary of a service area in which the shared vehicle is to remain, wherein the boundary of the service area comprises a shared vehicle service boundary encompassing an area where a plurality of shared vehicles are picked up or dropped off at different places throughout the service area;
  determining a starting point of the parking search route for the shared vehicle based on a location of a distribution of the plurality of shared vehicles in the boundary of the service area; and
  generating the parking search route for the shared vehicle to locate a parking space in proximity to the destination based, at least in part, on the boundary.

2. The method of claim 1, the method further comprising:
retrieving the service area, the boundary, or a combination thereof from a shared vehicle service operator.

3. The method of claim 1, wherein the boundary of the service area is determined based on a cost to the vehicle.

4. The method of claim 1, wherein the parking search route is generated to locate the parking space inside of the boundary of the service area.

5. The method of claim 1, further comprising:
determining that the destination is within a threshold distance of the boundary of the service area; and
initiating the parking search route from inside the boundary of the service area towards the destination.

6. The method of claim 1, wherein the boundary of the service area is determined based on a target geographic distribution of the vehicle.

7. The method of claim 6, wherein the parking search route is generated to locate the parking space inside the boundary of the service area to achieve the target geographic distribution.

8. The method of claim 7, further comprising:
receiving an input specifying one or more preferred road links to achieve the target geographic distribution; and
adjusting a parking availability probability, an associated cost, or a combination thereof for the one or more preferred road links to generate the parking search route.

9. The method of claim 1, further comprising:
generating an initial parking search route without considering the boundary of the service area, wherein the initial parking search route includes a plurality of road links in proximity to the destination; and
removing one or more of the plurality of road links that are outside of the boundary of the service area from the initial parking search route to generate the parking search route.

10. The method of claim 1, wherein the boundary of the service area is used as a routing parameter of a navigation system to generate the parking search route.

11. An apparatus for generating a parking search route comprising:
at least one processor; and
at least one memory including computer program code for one or more programs,
the at least one memory and the computer program code configured to, with the at least one processor, cause the apparatus to perform at least the following,
determine that a shared vehicle is nearing a destination;
determine a service constraint for the shared vehicle from a shared vehicle service operator;
determining a starting point of the parking search route for the shared vehicle based on a location of a distribution of a plurality of shared vehicles in a boundary of a service area established by the shared vehicle service operator; and
generate the parking search route for the shared vehicle to locate a parking space in proximity to the destination based, at least in part, on the service constraint.

12. The apparatus of claim 11, wherein the service constraint includes the boundary of the service area in which the shared vehicle is to be remain.

13. The apparatus of claim 12, wherein the parking search route is generated to locate the parking space inside of the boundary of the service area.

14. The apparatus of claim 12, wherein the apparatus is further caused to:
determine that the destination is within a threshold distance of the boundary of the service area; and
initiate the parking search route from inside the boundary of the service area towards the destination.

15. The apparatus of claim 11, wherein the service constraint is a target geographic distribution of the vehicle.

16. A non-transitory computer-readable storage medium for generating a parking search route, carrying one or more sequences of one or more instructions which, when executed by one or more processors, cause an apparatus to at least perform the following steps:
determining that a shared vehicle is nearing a destination;
determining a target distribution for the vehicle, wherein the target distribution is established by a shared vehicle service provider;
determining a starting point of the parking search route for the shared vehicle based on a location of a distribution of a plurality of shared vehicles in a boundary of a service area established by the shared vehicle service provider; and
generating the parking search route for the shared vehicle to locate a parking space in proximity to the destination based, at least in part, on the target distribution.

17. The non-transitory computer-readable storage medium of claim 16, wherein the apparatus is further caused to perform:
retrieving the target distribution from a shared vehicle service operator.

18. The non-transitory computer-readable storage medium of claim 16, wherein the target distribution includes the boundary of the service area in which the shared vehicle is to remain.

19. The non-transitory computer-readable storage medium of claim 18, wherein the parking search route is generated to locate the parking space inside of the boundary of the service area.

20. The non-transitory computer-readable storage medium of claim 18, wherein the apparatus is further caused to perform:
determining that the destination is within a threshold distance of the boundary of the service area; and
initiating the parking search route from inside the boundary of the service area towards the destination.

* * * * *